Patented Jan. 7, 1930

1,742,520

UNITED STATES PATENT OFFICE

NICHOLAS J. SHIELDS, OF SAN LUIS OBISPO, CALIFORNIA, ASSIGNOR OF ONE-HALF TO JOHN W. CUSHING, OF SAN FRANCISCO, CALIFORNIA

COATING AND METHOD OF MANUFACTURING THE SAME

No Drawing.  Application filed February 3, 1927. Serial No. 165,758.

My invention relates more particularly to coatings, in the nature of paint, for the portions of objects which, in use, are submerged in water, and more especially ship bottoms, piling and the like, for use in salt water, where they are subjected to the fouling accumulations of growth thereon, as for example and more particularly barnacles and fungi and to the impairing action of boring marine parasites, as for example teredos.

My primary object is to provide a coating for such objects which will be highly effective in preventing the accumulation thereon of growths as above referred to, and will be highly repellant to boring parasites, as for example teredos.

My invention contemplates the provision in the coating of a relatively large amount of substance poisonous to growths and boring parasites which, by reason of the toxic effect produced thereby, acts as a highly effective repellant for a period of time greatly in excess, and with greater effectiveness, than in the case of coatings as hitherto provided.

Another object is to provide the coating in such form that it may be readily applied, in the manner of paint and preferably either by brushing or spraying it, to the objects to be protected against fouling by growths and attack by boring parasites.

A specific example of a coating material embodying my invention may comprise the following ingredients in the following proportions for the manufacture of one gallon of the material:

| | |
|---|---|
| Wood alcohol | 76 oz. |
| Gum shellac, grade A | 24 oz. |
| Turpentine | 12 oz. |
| Pine tar oil | 12 oz. |
| Zinc oxide | 12 oz. |
| Indian red (iron oxide 60%) "metallic brown", or other iron oxide pigment | 12 oz. |
| Oxide of mercury (preferably yellow oxide) | 8 lbs. |

In compounding the material the shellac is first dissolved in the wood alcohol and the turpentine then added thereto, the turpentine being added slowly to the solution of shellac and alcohol while rapidly beating the solution to effect an emulsion. Upon completing emulsification as stated the pigment constituents comprising the oxide of mercury, the zinc oxide and the Indian red or metallic brown, all of which should be preparatorily finely ground into a smooth powder and intimately intermixed, is then added to the emulsified solution. The pigment should be added slowly to the solution, and thoroughly intermixed therewith while rapidly agitating the solution whereupon the pine tar oil is slowly added while thoroughly beating the mixture. The resultant mixture is of paint-like consistency and is ready to be applied to the object to be coated which latter may be submerged in water, if desired, immediately after the coating is applied, without damage to the coating.

My improved coating thus presents a large proportion of a poisonous ingredient, namely, oxide of mercury which is substantially uniformly disseminated throughout the mass of the coating material and which it is possible to provide in such relatively large amount in proportion to the other ingredients of the coating because of its intermixture with the other named ingredients. The coating thus provided therefore presents a highly powerful, rapidly operating and long enduring toxic preventative to all kinds of marine growth coming in contact with the surface of the object provided with the coating.

Furthermore, the coating material dries very quickly, strongly adheres to the object to which it is applied and is elastic to a high degree.

The coating material is adapted for the coating of both wood and metal objects. The specific formula above given, however, is best adapted for coating metal objects which latter are preferably given one or two coats of any desirable non-corroding paint, before applying my non-fouling coating thereto.

The inclusion of the zinc oxide in the mixture affords to the coating material relatively great elasticity, prevents the coating from cracking, and when the coating is used on steel objects, enhances the bond between the coating material and the previously applied non-corrosive paint.

While it is believed that the proportion of oxide of mercury as above stated, will be desirable for use under ordinary conditions, this proportion may be varied as desired, reducing the amount of oxide of mercury to as low an amount as four pounds to the gallon of mixture, or increasing it to as high as approximately twelve pounds per gallon, where conditions permit of such reduction or render desirable such increase. When the amount of oxide of mercury to be used is less than eight pounds per gallon, the amounts of zinc oxide and Indian red or metallic brown would be increased substantially equally, over the amounts given in the formula, to an amount substantially equal to the difference between the eight pounds specified in the above formula and the amount of oxide of mercury actually used; and when the amount of oxide of mercury is increased over that specified in the formula, the amount of zinc oxide and Indian red or metallic brown which would be used would be decreased substantially equally below the amounts given in the above formula to an amount substantially equal to the difference between the eight pounds specified and the amount of oxide of mercury actually used.

Various other changes may be made as to the proportions of the ingredients used, and omission and substitution of ingredients, may be made, without departing from the spirit of my invention.

The matter of varying the proportions of the named ingredients particularly applies to the carrying vehicle, the proportions between the carrying vehicle and the pigments rendering the mixture of thicker or thinner consistency depending upon the decreasing or increasing, respectively, of the proportion of the carrying vehicle to the other ingredients, it being understood that where coating material of a different consistency than that resulting from the mixture of ingredients in the proportions above stated, is desired, the proportion of the pigments to the other ingredients would be varied.

As examples of omission of certain of the named ingredients, it may be stated that while it is desired to use pine tar oil as specified, this ingredient may be omitted and certain of the benefits of the invention still be obtained; also for uses of the coating material under certain conditions the zinc oxide may be omitted as for example where the coating is to be applied to wood objects.

What I claim as new, anad desire to secure by Letters Patent, is:

1. The method of producing a coating material which consists in producing a solution of alcohol and gum shellac, mixing turpentine therewith and vigorously agitating the mixture to produce an emulsified solution, mixing with the emulsified solution powdered pigment comprising oxide of mercury and iron oxide and then mixing therewith pine tar oil.

2. The method of producing a coating material which consists in producing a solution of alcohol and gum shellac, mixing turpentine therewith and vigorously agitating the mixture to produce an emulsified solution, mixing with the emulsified solution powdered pigment comprising oxide of mercury, zinc oxide and iron oxide, and then mixing therewith pine tar oil.

3. A coating material comprising, in combination, a carrying vehicle, and a pigment, the pigment comprising a quantity of an oxide of mercury in excess of twenty-five percent of the entire weight of the material.

4. A coating material comprising, a siccative carrying vehicle and a pigment, the pigment comprising a quantity of an oxide of mercury equal to substantially fifty percent of the entire weight of the material.

5. A coating material comprising, in combination a carrying vehicle comprising an alcoholic solution of shellac and a pigment, the pigment comprising a quantity of an oxide of mercury in excess of twenty-five percent of the entire weight of the material.

6. A coating material comprising, in combination, a carrying vehicle emulsion comprising an alcoholic solution of shellac, and turpentine, and a pigment comprising a quantity of an oxide of mercury in excess of twenty-five precent of the entire weight of the material.

7. A coating material comprising, in combination, a carrying vehicle emulsion comprising a major quantity of an alcoholic solution of shellac and minor quantities of turpentine and pine tar oil, and a pigment comprising a mixture of a quantity of an oxide of mercury equal to more than twenty-five percent of the entire weight of the material mixed with iron oxide and zinc oxide in substantially smaller proportions.

8. The method of producing coating material which comprises vigorously agitating a mixture of an alcoholic solution of shellac with turpentine to produce an emulsion and subsequently intimately mixing with said emulsion a powdered pigment comprising an oxide of mercury.

9. A paint for marine use comprising a vehicle containing turpentine thoroughly emulsified in an alcoholic solution of shellac and a pigment comprising a major proportion of oxide of mercury and minor proportions of iron oxide and zinc oxide, the proportion of oxide of mercury being at least 4 lbs. per gallon of vehicle.

10. A marine point comprising an emulsion of turpentine in alcoholic shellac solution together with pine-tar oil, and a pigment intimately admixed therewith, said pigment consisting principally of oxide of mercury and the proportion of oxide of mercury being 8 lbs. per gallon of vehicle.

NICHOLAS J. SHIELDS.